Jan. 29, 1946.  W. L. CLAY  2,393,886
OIL FILTER
Filed Oct. 24, 1941  2 Sheets-Sheet 1

INVENTOR.
William L. Clay
BY
ATTORNEYS.

Jan. 29, 1946.　　　　W. L. CLAY　　　　2,393,886
OIL FILTER
Filed Oct. 24, 1941　　　　2 Sheets-Sheet 2

INVENTOR.
William L. Clay
BY Lancaster, Allwine and Rommel
ATTORNEYS.

Patented Jan. 29, 1946

2,393,886

UNITED STATES PATENT OFFICE 2,393,886

OIL FILTER

William L. Clay, Oklahoma City, Okla.

Application October 24, 1941, Serial No. 416,414

2 Claims. (Cl. 210—131)

This invention relates to improvements in oil filters.

The primary object of this invention is the provision of a lubricating oil filter primarily adapted for use in connection with internal combustion engines.

A further object of this invention is the provision of an improved oil filter of a relatively simple construction which will efficiently filter foreign materials from lubricating oil, and which includes a removable cartridge to which the operator may have ready access for removal and replacement.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved oil filter showing its line connections.

Figure 1:
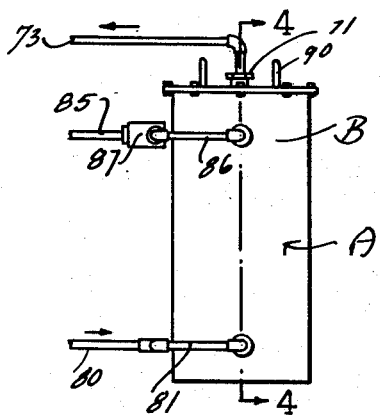
Figure 2:
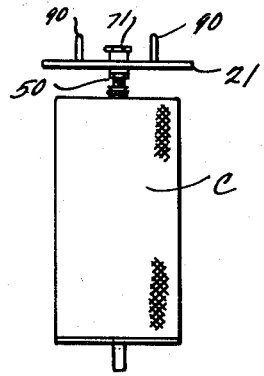
Figure 2 is a side elevation of the removable cartridge and its attached portions.
Figure 3:
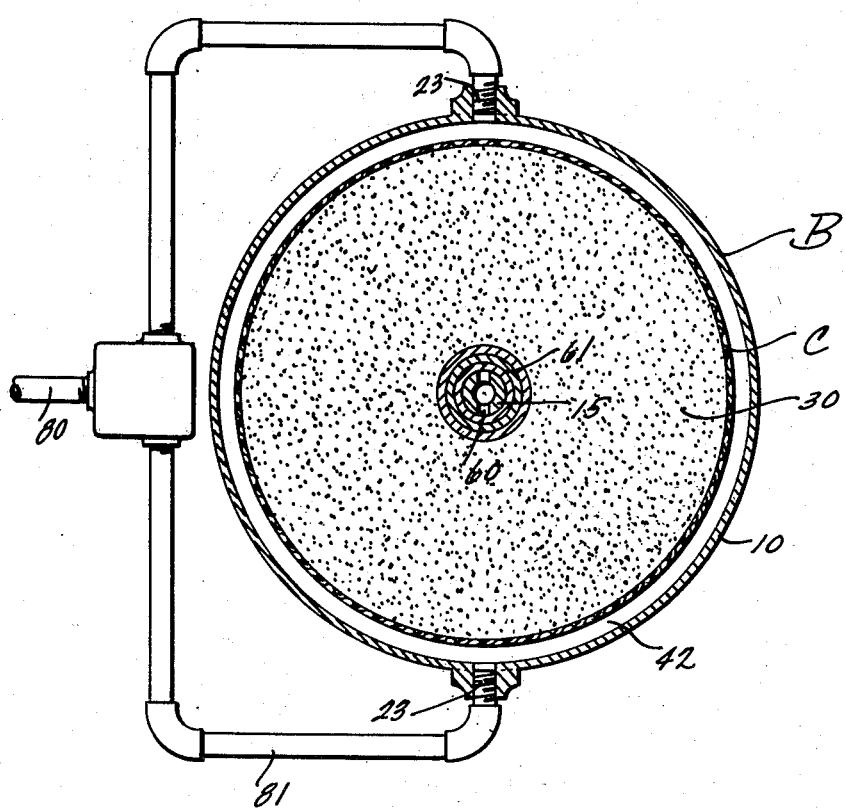
Figure 3 is a horizontal cross sectional view taken substantially on the line 3—3 of Figure 4.

In the drawings, wherein for the purpose of illustration is shown only a preferred embodiment of the invention, the letter A may generally designate the improved oil filter, which preferably includes a casing B; filter cartridge C and means D mounting the filter cartridge in place.

The casing B preferably comprises a cylindrical body portion 10 having a bottom wall 11. The latter is centrally provided with upstanding step seat 12 forming a socket adapted to receive the lower end of a clean oil discharge line 15, forming part of the means D, and which will be subsequently described. The bottom wall 11 is provided with a suitable drain opening 15ª which may be closed by a plug or pet cock 16 of any approved construction.

The cylindrical body 10 is open at its top and provided with an outwardly extending flange 20 to which the top wall 21 of the casing is attached, as by bolt means 22. This top wall 21 forms part of the means D which mounts the cartridge C in position.

At its lower end the cylindrical shaped body 10 is provided with dirty oil intake ports 23, in diametrically opposed relation; formed by attaching suitable bosses upon the interior of the casing 10, as by welding. Similarly, adjacent its upper end the body 10 is provided with dirty oil outlet ports 24, in diametrically opposed relation. These ports 24 are also formed by attaching suitable bosses to the casing 10, as can be seen in Figure 4.

The filter cartridge C preferably comprises a cylindrical shaped perforate bag of woven ducking and receives therein a concentrated filter earth composition, designated at 30, preferably fuller's earth.

Figure 4:
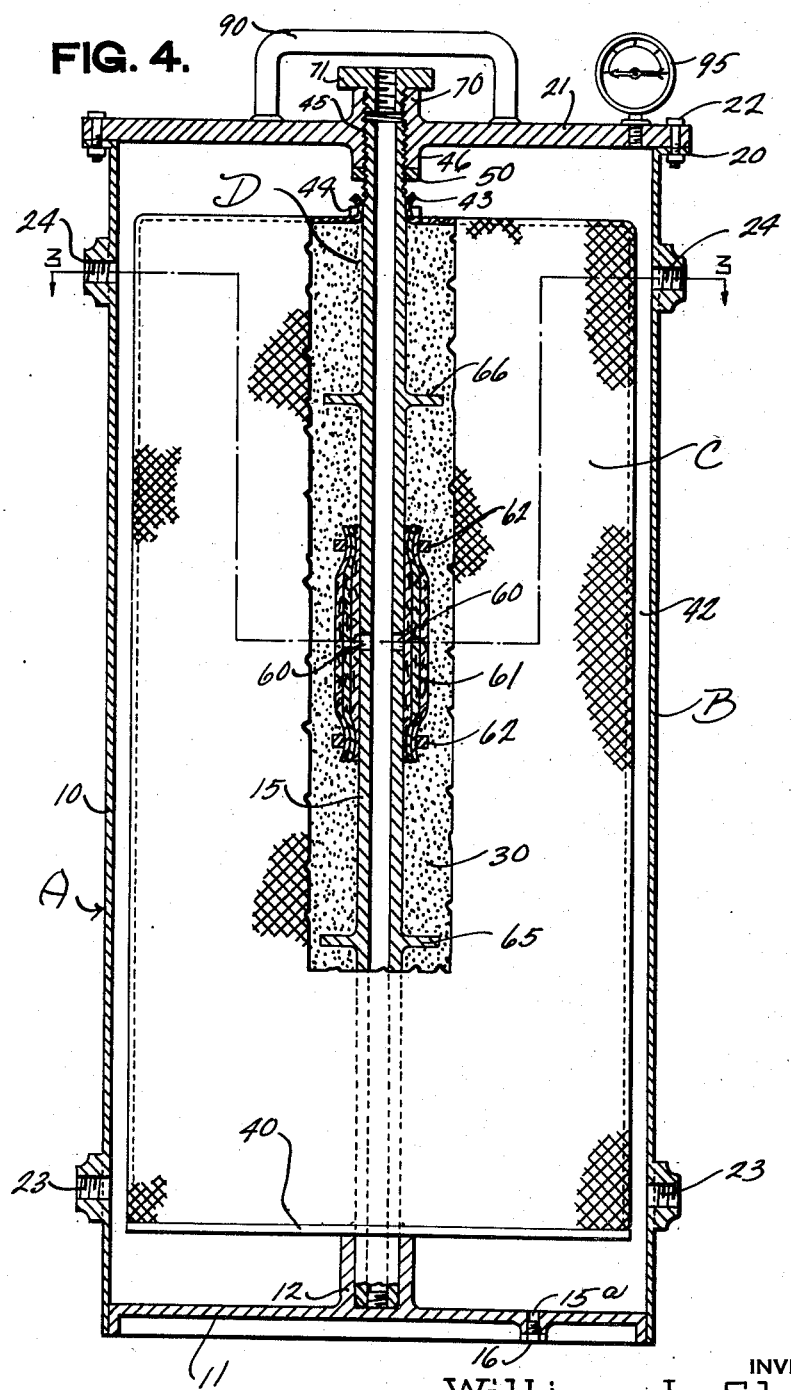
Figure 4 is a vertical sectional view taken through the improved oil filter substantially on the line 4—4 of Figure 1.

The mode of assembling the cartridge C and of shaping the same is to provide a disc shaped baffle and base plate 40, either integral or welded upon the clean oil line 15; a stub portion of the clean oil line 15 projecting below the plane of the baffle 40 and adapted to seat in the socket provided by the step seat 12, as is shown in Figure 4. The disc 40 really rests upon the top edge of the step seat 12 and locates the base or baffle 40 in spaced relation above the bottom 11. The disc 40 terminates at its marginal edge short of the interior surface of the cylinder 10, preferably half an inch, to permit circulation of the oil to be filtered. The earth is packed in cylindrical formation in the duck bag and mounted on the baffle-base 40 so as to be circumferentially spaced from the internal surface of the cylinder 10 about half an inch; the space being designated at 42 in Figure 4 of the drawings. The top of the duck bag is necked, as at 43, and secured by a suitable band 44 upon the upper end of the clean oil line 15.

The clean oil line 15 projects above the cartridge C and is externally screw threaded at 45. This screw threaded end is detachably connected in the internal threaded depending sleeve portion 46 centrally provided upon the top wall 21 of the casing. A lock nut 50 is threaded upon the screw threaded upper end of line 15 and locks against the lower edge of the sleeve or boss 46 to definitely lock the pipe 15 and the cartridge C therewith upon the top wall 21 forming the casing. It is thus readily observable that the cartridge can be removed and replaced with respect to the casing B, by reason of its attachment to the detachable top wall 21 of the casing.

About midway between its ends, the clean oil line 15 is provided with a series of port openings 60 adapted to receive the oil after it is filtered through the material C. The pipe line is provided with three or more layers of heavy filter felt; the same being wound circumferentially about the line 15 and secured by suitable bands 62 above and below the ports 60.

In order to prevent channeling or creeping of the oil vertically along the pipe 15 I prefer to provide annular flanges 65 and 66 forming baffles above and below the filtering felt 61, in the relation shown in Figure 4 of the drawings.

It is to be noted that the spaces between the cartridge C and the bottom and top walls of the casing B are of about the same height, and greater than the space surrounding the cartridge C. This enables a very efficient circulation of dirty oil for filtering purposes.

I provide a sleeve extension 70 on the top wall 21, at the upper surface thereof; contiguous with the extension 46 depending into the casing. It is internally screw threaded and adapted to detachably receive a bushing 71. The latter is internally screw threaded and adapted to receive the clean oil outlet line 73 leading to the engine.

The intake oil line 80 from the crank case is connected by means of a yoke 81 to the two ports 23. Similarly, the return line 85 to the crank case, through which excess dirty oil which cannot be filtered is returned to the crank case, is connected by a yoke 86 to the two outlet ports 24. In this line connection 85 there is positioned a pressure regulating valve 87 for the purpose of holding the pressure in the filter to approximately thirty pounds, in order to facilitate filtering of the oil by forcing it through the earth concentrate and into the passageway of the line 15, where the pressure is lower.

The top wall 21 of the casing is preferably provided with carrying handles 90.

The top wall 21 of the casing also has a pressure gauge 95.

Various changes in the shape, size, and arrangement of parts may be made to the form of invention herein shown and described, without departing from the spirit of the invention and the scope of the claims.

I claim:

1. An oil filter comprising a rigid cylindrical casing, including side, top and bottom walls, said side walls formed at their upper end with an outwardly projecting annular flange, said top wall removably engaging said flange, means attaching through said top wall and said flange for securing the top wall to the flange, a pair of handles, fixed to the upper side of said top wall, upwardly and downwardly extending bosses centrally disposed on said top wall, said bosses formed with an internally threaded communicating passage, said bottom wall formed with a downwardly extending annular flange, said flange being fixed to said side walls, said bottom wall formed with an upwardly extending centrally disposed boss and a drain opening, said side walls formed with a pair of diametrically opposed inlet openings spaced upwardly from said bottom wall and a pair of diametrically opposed dirty oil outlet openings spaced downwardly from said upper wall, a tube depending from said upper wall and threadably engaged therewith through said downwardly extending boss, said tube removably engaging said upwardly extending boss on said bottom wall, said tube formed with a wide annular flange near the lower end thereof, said flange spaced slightly inwardly from said side walls and adapted to engage the upwardly extending boss of said lower wall, a plurality of small annular flanges intermediate the length of said tube, said tube formed with openings between said smaller flanges and a closely woven fabric pad detachably secured to said tube and covering said openings, a fabric casing surrounding said tube, filtering material enclosed within said fabric casing, said fabric casing supported at its lower end by said wide flange, the sides of said casing being spaced from the side walls and perpendicular to the periphery of said wide flange, said fabric casing extending upwardly from said wide flange and encompassing said smaller flanges and said fabric pad and closing around said tube forming an upper surface spaced below said upper wall.

2. An oil filter as set forth in claim 1 including tubes connecting said diametrically opposed upper openings of said side wall and a pressure regulating valve connected between said latter tubes.

WILLIAM L. CLAY.